United States Patent
Lopez et al.

(10) Patent No.: US 9,821,608 B2
(45) Date of Patent: Nov. 21, 2017

(54) TIRE AND MOLD COMPRISING A FLUIDIC PASSAGE

(75) Inventors: Jose Merino Lopez, Clermont-Ferrand (FR); Didier Vasseur, Clermont-Ferrand (FR); Olivia Cuscito, Clermont-Ferrand (FR); Sylvain Petitjean, Clermont-Ferrand (FR)

(73) Assignees: COMPAGNIE GENERALE DES ETABLISSEMENTS MICHELIN, Clermont-Ferrance (FR); Michelin Recherche et Technique S.A., Granges-Paccot (CH)

( * ) Notice: Subject to any disclaimer, the term of this patent is extended or adjusted under 35 U.S.C. 154(b) by 743 days.

(21) Appl. No.: 13/823,625

(22) PCT Filed: Sep. 14, 2011

(86) PCT No.: PCT/FR2011/052096
§ 371 (c)(1),
(2), (4) Date: May 24, 2013

(87) PCT Pub. No.: WO2012/035256
PCT Pub. Date: Mar. 22, 2012

(65) Prior Publication Data
US 2013/0240102 A1 Sep. 19, 2013

(30) Foreign Application Priority Data
Sep. 14, 2010 (FR) ...................... 10 57324

(51) Int. Cl.
*B60C 11/00* (2006.01)
*B60C 11/13* (2006.01)
(Continued)

(52) U.S. Cl.
CPC .......... *B60C 11/0327* (2013.01); *B29C 33/42* (2013.01); *B29D 30/0061* (2013.01);
(Continued)

(58) Field of Classification Search
CPC ... B29C 33/42; B29D 30/0606; B60C 11/005; B60C 2011/147; B60C 2011/0355; B60C 11/1263; B60C 11/1353
See application file for complete search history.

(56) References Cited

U.S. PATENT DOCUMENTS

| 5,234,326 A * | 8/1993 | Galli ..................... B29C 33/10 425/46 |
| 2010/0065173 A1* | 3/2010 | Zhang ................... B60C 11/005 152/209.5 |

FOREIGN PATENT DOCUMENTS

| EP | 0 576 130 | 12/1993 |
| EP | 576130 A1 * | 12/1993 |

(Continued)

OTHER PUBLICATIONS

Machine translation for Japan 2001-191736 (no date).*
(Continued)

Primary Examiner — Steven D Maki
(74) Attorney, Agent, or Firm — Cozen O'Connor

(57) ABSTRACT

The tire (10B) comprises a tread (12) including a running layer (14) which is intended to come into contact with the ground when the tire (10B) rolls on the ground, and a sublayer (16) located radially inwards from the running layer (14). The tread (12) comprises at least one fluid passage (22) between the sublayer (16) and the air surrounding the tire (10B). The sublayer (16) comprises a cellular material. The fluid passage (22) comprises an element chosen from a groove (20) and a cut (26), formed in the running layer (14) and extended by at least one well (28) acting as a radial extension of the element, formed between the groove (20) and/or the cut (26) and the sublayer (16). Each well (28) forms a localized part of the fluid passage (22).

3 Claims, 2 Drawing Sheets

(51) Int. Cl.
    *B60C 11/03*          (2006.01)
    *B29C 33/42*          (2006.01)
    *B29D 30/06*          (2006.01)
    *B29D 30/00*          (2006.01)
    *B60C 11/12*          (2006.01)
    *B60C 11/14*          (2006.01)

(52) U.S. Cl.
    CPC .......... *B29D 30/0606* (2013.01); *B60C 11/00* (2013.01); *B60C 11/005* (2013.01); *B29D 2030/061* (2013.01); *B60C 11/1263* (2013.01); *B60C 11/1353* (2013.01); *B60C 2011/0355* (2013.01); *B60C 2011/147* (2013.01)

(56) References Cited

FOREIGN PATENT DOCUMENTS

| | | | | |
|---|---|---|---|---|
| EP | 1582378 A1 | * | 10/2005 | |
| EP | 2 039 531 | | 3/2009 | |
| GB | 1412351 A | * | 11/1975 | |
| JP | 62-283001 A | * | 12/1987 | |
| JP | 6 008708 | | 1/1994 | |
| JP | 07-186620 A | * | 7/1995 | |
| JP | 2001-191736 A | * | 7/2001 | |
| JP | 2006-281689 A | * | 10/2006 | |

OTHER PUBLICATIONS

Machine translation for Japan 07-186620 (no date).*
Translation for Japan 62-283001 (no date).*
Machine translation for Japan 2006-281689 (no date).*

* cited by examiner

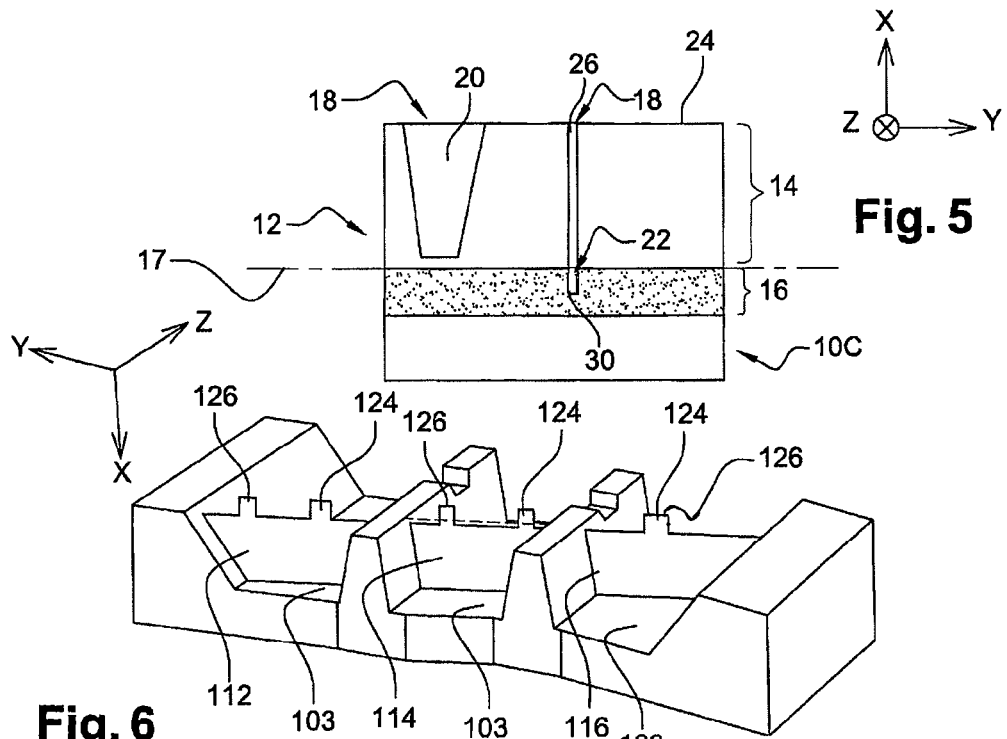
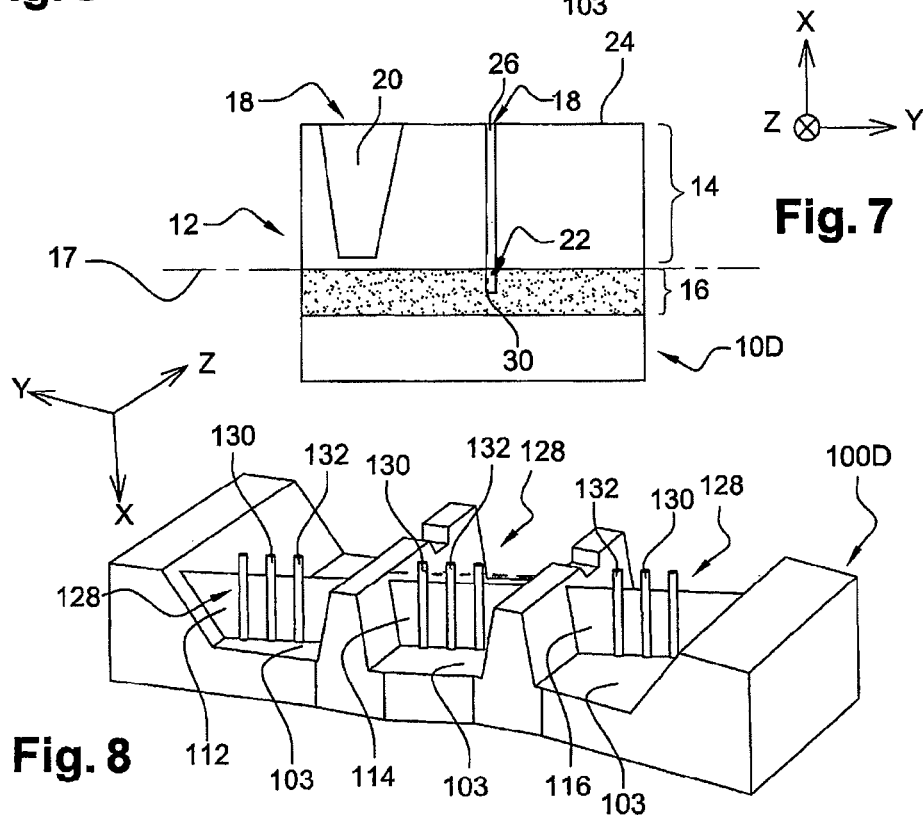

TIRE AND MOLD COMPRISING A FLUIDIC PASSAGE

RELATED APPLICATIONS

This is a U.S. national stage of application No. PCT/FR2011/052096, filed on Sep. 14, 2011.

This patent application claims the priority of French application no. 10/57324 filed Sep. 14, 2010, the disclosure content of which is hereby incorporated by reference.

FIELD OF THE INVENTION

The present invention relates to a tire and a curing mould.

BACKGROUND OF THE INVENTION

A tire having a tread provided with a running surface comprising a conventional rubber is known from the prior art. This running surface is intended to come into contact with the ground when the tire rolls on the ground.

More specifically, the running surface comprises various plies of rubber adapted to the rolling of the tire on the ground. These plies have high wear resistance properties.

In some cases, in order to limit the rolling noise of the tire on the ground, the tread is also provided with a layer comprising a cellular material. The cellular material comprises, for example, a foam, in other words a material in which cells are formed by gas bubbles.

Because cellular material wears away more quickly than conventional rubber, it has been proposed that the layer comprising the cellular material be positioned radially inwards from the running surface, the cellular material thus forming a sublayer of the tread.

The sublayer is therefore generally interposed radially between the running surface and a reinforcement having metal or textile reinforcers embedded in bodies of rubber.

When the tire is cured, a chemical reaction generates gas bubbles which form the cells of the cellular material. However, the gas which is formed may tend to accumulate in regions forming relatively large accumulation cells. If these accumulation cells are too large, or if they are located at the interface between the running surface and the sublayer, their pressure causes the running surface to be detached from the sublayer. In this case, the tire cannot be sold, because its reliability is not satisfactory.

SUMMARY OF THE INVENTION

One object of the invention is to optimize the reliability of a tire having a sublayer of cellular material.

For this purpose, one aspect of the invention is directed to a tire comprising a tread including a running layer, intended to come into contact with the ground when the tire rolls on the ground, and a sublayer, comprising a cellular material, located radially inwards from the running layer, the tread comprising at least one fluid passage between the sublayer and the air surrounding the tire, the fluid passage comprising at least one element chosen from a groove and a cut, formed in the running surface and extended by at least one well acting as a radial extension of the element, formed between the groove and/or the cut and the sublayer, each well forming a localized part of the fluid passage.

The effect of the invention is to reduce or even eliminate the risk of detachment of the running layer from the sublayer. This is because the fluid passage makes it possible to discharge to the outside of the tire the pressurized gas which would tend to form large accumulation cells in the course of the curing of the tire. Thus cells of excessively large size are avoided.

Each well forms a discrete passage part, thus avoiding the use of a continuous passage part along the whole length of the element, which may be a groove or a cut, which it extends. Consequently the well extends only a part of the length of the groove or cut. Thus the passage wells can be used to reduce the risk of separation of the running layer and the sublayer from each other, by contrast with a continuous passage along the whole length of the element, which would promote the separation of the running layer and the sublayer from each other.

The grooves and cuts of the running layer are used to evacuate the pressurized air from the accumulation bubbles. The grooves are substantially circumferential and extend around the tire, substantially parallel to the circumferential direction of the tire. In a variant, the grooves extend around the tire along a path which is not parallel to the circumferential direction of the tire.

The fluid passage is formed, on the one hand, by the groove and/or cut which opens into the air surrounding the tire, and, on the other hand, by the well opening into the cellular sublayer. Thus the well provides a fluid connection between the groove and/or cut and the cellular sublayer.

According to optional characteristics of the tire according to embodiments of the invention:

The fluid passage is formed in the running layer. In a variant, the fluid passage is formed in another layer of the tire, for example in a body of rubber forming a layer of the sidewall or shoulder of the tire.

The passage extends radially between an outer surface of the tread and the sublayer. Preferably, the passage extends along a substantially rectilinear path. In a variant, the passage extends along a substantially curvilinear path.

Preferably, the void fraction of the cellular material is in the range from 10% to 60% by volume, or more preferably from 25% to 50%, the void fraction T being defined by $T=Vg/Vm$, where $Vg$ is the total volume of cells in the cellular material, and $Vm$ is the total volume of the body of cellular material (including the cells).

One aspect of the invention is directed to a curing mould for a tire as defined above, the mould comprising an element for moulding the fluid passage, including an element for moulding the groove and/or cut in the running layer, extended radially by at least one element for moulding the well.

In another embodiment, the mould comprises a component for moulding the fluid passage, including a crenellated moulding blade.

BRIEF DESCRIPTION OF THE DRAWINGS

The invention will be more clearly understood from the following description which is provided solely by way of non-limiting examples and which refers to the drawings, in which:

FIGS. 5 and 6 are views similar to views 1 and 2 of a tire and a mould according to a second embodiment of the invention; and FIGS. 7 and 8 are views similar to views 1 and 2 of a tire and a mould according to a third embodiment of the invention.

DETAILED DESCRIPTION OF THE DRAWINGS

Figure 1:
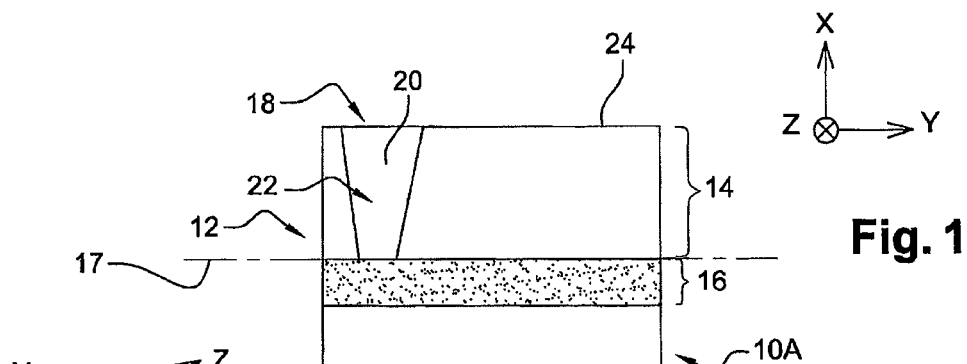
FIG. 1 is a schematic view in axial section of part of a tread of a tire according to an embodiment which is not claimed.

In the drawings, the axes X, Y and Z are represented as orthogonal to each other, corresponding to the usual radial (X), axial (Y) and circumferential (Z) orientations of a tire.

FIG. 1 shows a tire according to an embodiment which is not claimed, indicated by the general reference 10A.

The tire 10A comprises a tread 12.

The tread 12 comprises, among other elements, a running layer 14 which is intended to come into contact with the ground when the tire 10A rolls on the ground. The tread 12 further comprises a sublayer 16 located radially inwards from the running layer 14. The sublayer 16 comprises a cellular material, which in this case is a foam. In FIG. 1, the radially outer terminal face of the sublayer 16 is delimited by a broken line 17.

Preferably, the void fraction in the cellular material is in the range from 10% to 60% by volume, or more preferably from 25% to 50%, the void fraction T being defined by T=Vg/Vm, where Vg is the total volume of cells in the cellular material, and Vm is the total volume of the body of cellular material (including the cells).

The tread 12, in this case the running surface 14, comprises sculptures 18. The sculptures 18 comprise a groove 20 formed in the running layer. In this case, the groove 20 extends circumferentially around the tire 10A.

The tread 12 also comprises at least one fluid passage 22 between the sublayer 16 and the air surrounding the tire 10A. Here, the fluid passage 22 is formed in the running layer 14. The passage 22 extends radially between an outer surface 24 of the tread 12 and the sublayer 16. In this embodiment which is not claimed, the passage 22 comprises, and in this case is formed by, the groove 20. The groove 20 opens, on the one hand, into the air surrounding the tire 10A and, on the other hand, into the sublayer 16.

Figure 2:
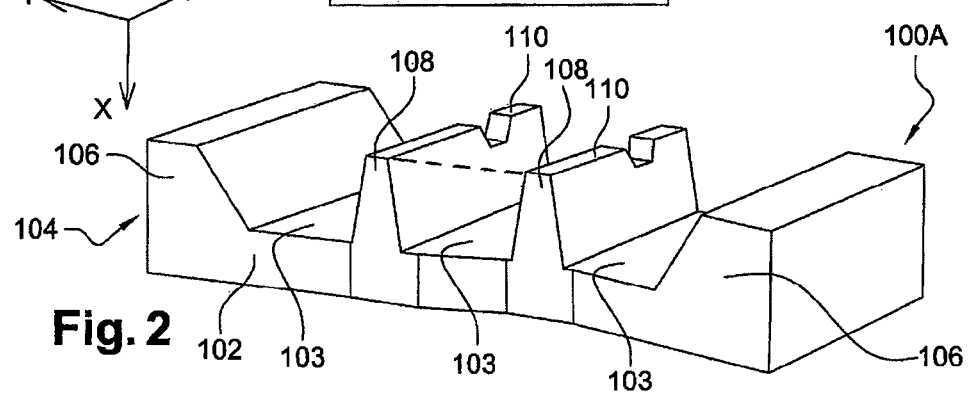
FIG. 2 is a schematic perspective view of a matrix of a curing mould for the tire of FIG. 1 according to an embodiment which is not claimed.

FIG. 2 shows a moulding matrix of a mould according to an embodiment which is not claimed, indicated by the general reference 100A.

The matrix 100A comprises a base 102 carrying elements 104 for moulding the tread 12. The matrix 100A comprises a surface 103 for moulding the outer surface 24. The elements 104 comprise elements 106 for moulding the shoulders of the tire 12, as well as elements 108 for moulding two circumferential grooves 20. The elements 108 include radial ends 110 which delimit the bottom of each circumferential groove 20.

As shown in FIG. 2, the elements 108 extend radially from the surface 103 over a distance greater than the distance separating the surface 24 from the face 17 of the sublayer 16. In other words, the radial terminal face of the sublayer 16 is located radially outwards from the radial ends 110 of the elements 108, in such a way that each element 108 can be used to mould the fluid passage 22 in the running layer 14.

Figure 3:
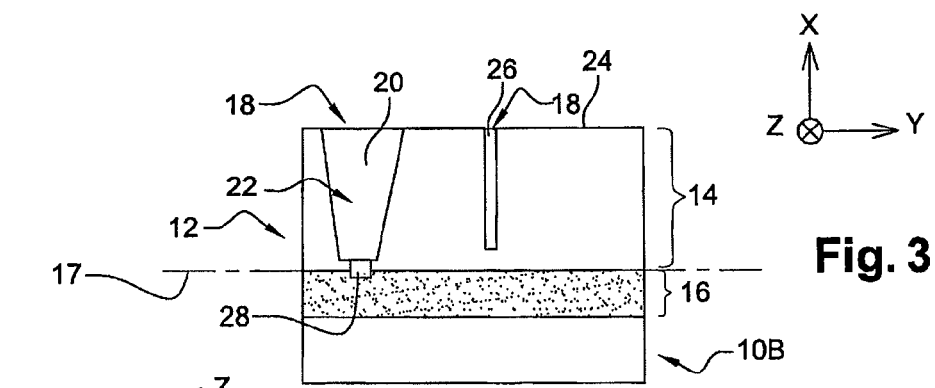
FIGS. 3 and 4 are views similar to views 1 and 2 of a tire and a mould according to a first embodiment of the invention.
Figure 4:
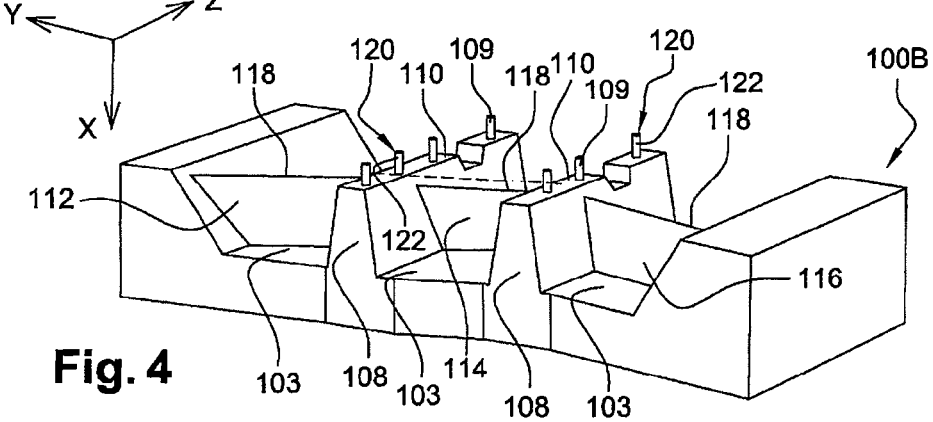

FIGS. 3 and 4 show a tire 10B and a matrix 100B of a mould according to a first embodiment. Elements similar to those shown in the preceding embodiment are denoted by identical references.

By contrast with the tire 10A, the tread 12 comprises a cut 26.

Furthermore, the fluid passage 22 comprises, on the one hand, the circumferential groove 20 opening into the air surrounding the tire 10B and, on the other hand, a well 28 forming a radial extension of the groove 20 and opening into the sublayer 16. The well 28 has a general shape of revolution, which is cylindrical in this case.

By contrast with the tire 10A, the groove 20 does not open directly into the sublayer 16, but opens into it through the well 28. Each extension well 28 forms a localized part of the fluid passage between the passage element which it extends, in this case the groove 20, and the sublayer 16. In this case, each well 28 radially extends only a part of the length of the groove 20.

By contrast with the matrix 100A, the radial terminal face of the sublayer 16 is located radially inwards from the radial ends 110 of the elements 108 for moulding the two circumferential grooves 20.

The matrix 100B comprises, in addition to the elements of the matrix 100A, blades 112-116 for moulding the cuts 26. Each blade 112-116 comprises a radially inner free edge 118. The radial terminal face of the sublayer 16 is located radially inwards from the free ends 118 of the blades 112-116.

The matrix 100B also comprises moulding elements 120 which extend the moulding elements 108 and which each have a radially inner end 109. In this case, the elements 120 comprise pins 122. Each pin 122 has a general shape of revolution, which is cylindrical in this case. The elements 108, 120 extend radially from the surface 103 over a distance greater than the distance separating the surface 24 from the face 17 of the sublayer 16. In other words, the radial terminal face of the sublayer 16 is located radially outwards from the radial ends 109 of the elements 120 in such a way that each element 108, 120 can be used to mould the fluid passage 22 in the running layer 14.

FIGS. 5 and 6 show a tire 100 and a matrix 100C of a mould according to a second embodiment. Elements similar to those shown in the preceding embodiments are denoted by identical references.

By contrast with the tire 10B, the fluid passage 22 comprises, on the one hand, the cut 26 opening into the air surrounding the tire 100 and, on the other hand, a well 30 forming a radial extension of the cut 26 and opening into the sublayer 16. The well 30 has a generally parallelepipedal shape. Each extension well 30 forms a localized part of the fluid passage between the passage element which it extends, in this case the cut 26, and the sublayer 16. In this case, each well 30 radially extends only a part of the length of the cut 26. The fluid passage 22 opens, on the one hand, into the air surrounding the tire 10C and, on the other hand, into the sublayer 16.

By contrast with the matrix of the mould 100B, at least one blade 112-116, and in this case each blade 112-116, is of crenellated shape. In this case, each blade 112-116 comprises projections 124 having radial free ends 126. The projections 124 extend radially from the surface 103 over a distance greater than the distance separating the surface 24 from the face 17 of the sublayer 16. In other words, the projections 124 extend radially inwards in such a way that the radial terminal face of the sublayer 16 is located radially outwards from the free ends 126 of each blade 124.

FIGS. 7 and 8 show a tire 10D and a matrix 100D of a mould according to a third embodiment. Elements similar to those shown in the preceding embodiments are denoted by identical references.

By contrast with the tire 10B, the fluid passage 22 comprises, on the one hand, the cut 26 opening into the air surrounding the tire 100 and, on the other hand, a well 30 forming a radial extension of the cut 26 and opening into the sublayer 16. The well 30 has a general shape of revolution, which is cylindrical in this case. Each extension well 30 forms a localized part of the fluid passage between the passage element which it extends, in this case the cut 26, and the sublayer 16. In this case, each well 30 radially extends only a part of the length of the cut 26.

By contrast with the matrix of the mould 100B, at least one blade 112-116, and in this case each blade 112-116, comprises elements 128 for moulding the wells 30. Each element 128 comprises a pin 130 having a free end 132 and extending radially from the surface 103 over a distance greater than the distance separating the surface 24 from the face 17 of the sublayer 16. In other words, the radial terminal face of the sublayer 16 is located radially outwards from the free ends 132 of the pins 130.

The invention is not limited to the embodiments described above. Indeed, the characteristics of the tires and moulds of the preceding embodiments can be independently combined with each other, since they are compatible. Among other possibilities, the characteristics of the tires and moulds shown in FIGS. 3 and 4, on the one hand, can be combined with those shown in 5 and 6 or 7 and 8 on the other hand.

The invention claimed is:

1. A tire comprising a tread including a running layer having a running surface configured to come into contact with the ground when the tire rolls on the ground, and a sublayer, comprising a cellular material, located radially inwards from the running surface of the running layer of the tread, the running layer being a single running layer contacting the sublayer, the tread comprising at least one fluid passage arranged between the sublayer and the air surrounding the tire, the at least one fluid passage comprising at least one element chosen from the group consisting of a groove and a cut, the at least one fluid passage being formed in the running layer and extended by at least one radial extension of the at least one element, the at least one radial extension extending within and opening into the interior of the sublayer, which allows evacuation of fluid from the cellular material to the air surrounding the tire, wherein each radial extension forms a localized part of the fluid passage and radially extends for only a part of the length of the at least one element, and wherein a bottom surface of the at least one element is formed within the running layer such that the bottom surface of the at least one element is spaced from a radially outer surface of the sublayer.

2. The tire according to claim 1, wherein a void fraction T in the cellular material is in the range from 10% to 60% by volume, the void fraction T being defined by $T=Vg/Vm$, where $Vg$ is the total volume of cells in the cellular material, and $Vm$ is the total volume of the body of cellular material including the cells.

3. The tire according to claim 2, wherein the void fraction T in the cellular material is in the range from 25% to 50%.

* * * * *